(12) United States Patent
Ierullo et al.

(10) Patent No.: US 9,836,768 B2
(45) Date of Patent: Dec. 5, 2017

(54) METHOD, SYSTEM AND APPARATUS FOR ASSOCIATING VENDOR DATA WITH KEYWORDS STORED IN A MOBILE ELECTRONIC DEVICE

(75) Inventors: Salvatore Ierullo, Oakville (CA); Bradley Michael Marks, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 400 days.

(21) Appl. No.: 12/897,448

(22) Filed: Oct. 4, 2010

(65) Prior Publication Data

US 2012/0084157 A1    Apr. 5, 2012

(51) Int. Cl.
*G06Q 30/00* (2012.01)
*G06Q 30/02* (2012.01)

(52) U.S. Cl.
CPC .................. *G06Q 30/0275* (2013.01)

(58) Field of Classification Search
CPC .................................. G06Q 30/0275
USPC ................................. 705/14, 14.71
See application file for complete search history.

(56) References Cited

U.S. PATENT DOCUMENTS

| 6,553,313 | B1 | 4/2003 | Froeberg | |
| 2005/0251331 | A1* | 11/2005 | Kreft ........................ | G01C 3/08 701/438 |
| 2006/0136310 | A1 | 6/2006 | Gonen et al. | |
| 2006/0217110 | A1 | 9/2006 | Othmer | |
| 2006/0242017 | A1* | 10/2006 | Libes et al. ..................... | 705/14 |
| 2007/0061057 | A1 | 3/2007 | Huang et al. | |
| 2007/0244750 | A1* | 10/2007 | Grannan et al. ................ | 705/14 |
| 2007/0250383 | A1 | 10/2007 | Tollinger et al. | |
| 2007/0269038 | A1 | 11/2007 | Gonen et al. | |
| 2008/0046924 | A1* | 2/2008 | Hood .............................. | 725/36 |
| 2008/0162329 | A1* | 7/2008 | Knapp et al. ................... | 705/37 |

(Continued)

FOREIGN PATENT DOCUMENTS

WO    2008147919    12/2008

OTHER PUBLICATIONS

Priceline.com, downloaded from http://findarticles.com/p/articles/mi_m0EIN/is_1998_August_11/ai_50236743/.

(Continued)

*Primary Examiner* — Mario C Iosif
(74) *Attorney, Agent, or Firm* — Jon Gibbons; Fleit Gibbons Gutman Bongini & Bianco P.L.

(57) ABSTRACT

According to embodiments described in the specification, a method, system and apparatus for associating vendor data with keywords in a wireless mobile communication device are provided. The method comprises: receiving an auction request comprising a keyword identifying a required offering and one or more parameters associated with the keyword, each parameter defining a required attribute of the offering; retrieving a plurality of vendor bids, each bid comprising one or more vendor parameters associated with the keyword, each vendor parameter defining an attribute of a vendor offering corresponding to the required offering; determining whether each of the vendor bids satisfies the required attributes defined by the parameters; and when the determination is affirmative for at least one vendor bid, transmitting vendor data for a vendor associated with the at least one vendor bid to the mobile electronic device for storage at the mobile electronic device in association with the keyword.

17 Claims, 9 Drawing Sheets

(56) References Cited

U.S. PATENT DOCUMENTS

2008/0306862 A1* 12/2008 Montgomery .................. 705/37
2010/0035596 A1* 2/2010 Nachman et al. ............ 455/418
2010/0223279 A1 9/2010 Scott

OTHER PUBLICATIONS

Demographic Targeting on Google AdWords, Jan. 24, 2008, downloaded from http://www.accuracast.coni/search-daily-news/ppc-7471/demographic-tar . . .

Canadian Office Action dated Mar. 20, 2015, received for Canadian Application No. 2,754,306.

"Canadian Application Serial No. 2,754,306, Response filed Jun. 28, 2014 to Office Action dated Jan. 28, 2014", 7 pgs.

"Canadian Application Serial No. 2,754,306, Office Action dated Jan. 28, 2014", 3 pgs.

"European Application Serial No. 10186414.8, Amendment filed Oct. 20, 2011", 13 pgs.

"European Application Serial No. 10186414.8, Extended Search Report dated Aug. 19, 2011", 4 pgs.

Canadian Office Action dated Jan. 31, 2017, received for Canadian Application No. 2,754,306.

Canadian Examination Report dated Jul. 24, 2017 for Canadian Application No. 2,754,306.

* cited by examiner

448

|  | Vendor 140a | Vendor 140b | Vendor 140c |
|---|---|---|---|
| Flavours | Vanilla, mint | Chocolate | Chocolate, vanilla |
| Price | $3.50 | $1.90 | $1.85 |
| ... | ... | ... | ... |

METHOD, SYSTEM AND APPARATUS FOR ASSOCIATING VENDOR DATA WITH KEYWORDS STORED IN A MOBILE ELECTRONIC DEVICE

FIELD

The present disclosure relates generally to mobile electronic devices, and more particularly to a method and apparatus for associating vendor data with keywords in a mobile electronic device.

BACKGROUND

Mobile communication devices, such as Personal Digital Assistants (PDAs), cellular telephones, smart phones, etc., are known for storing contact information, calendar events and other data. Such devices can also include communications functionality for conducting wireless telephone calls, email exchange, web browsing, and the like.

It is known in the prior art to deliver advertisements to such mobile devices based on advertiser auctions to purchase space on the mobile devices. In such prior art systems, advertisers can use demographic or psychographic information to set auction bid prices.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of associating vendor data with keywords at a mobile electronic device is provided, the method comprising: receiving an auction request at an auction server, the auction request comprising a keyword identifying a required offering, the auction request further comprising one or more parameters associated with the keyword, each parameter defining a required attribute of the required offering; retrieving a plurality of vendor bids at the auction server, each vendor bid comprising one or more vendor parameters associated with the keyword, each vendor parameter defining an attribute of a vendor offering corresponding to the required offering; determining, at the auction server, whether each of the vendor bids satisfies the required attributes defined by the parameters; and when the determination is affirmative for at least one vendor bid, transmitting vendor data for a vendor associated with the at least one vendor bid to the mobile electronic device for storage at the mobile electronic device in association with the keyword.

According to another aspect of the specification, a non-transitory computer-readable storage medium is provided, the computer-readable storage medium storing computer-readable instructions executable by a processor for implementing the above method.

According to a further aspect of the specification, a server is provided comprising: a memory; a communications interface; and a processor interconnected with the memory and the communications interface, the processor configured to receive an auction request via the communications interface, the auction request comprising a keyword identifying a required offering, the auction request further comprising one or more parameters associated with the keyword, each parameter defining a required attribute of the required offering; the processor further configured to retrieve a plurality of vendor bids, each vendor bid comprising one or more vendor parameters associated with the keyword, each vendor parameter defining an attribute of a vendor offering corresponding to the required offering; the processor further configured to determine whether each of the vendor bids satisfies the required attributes defined by the parameters; and, when the determination is affirmative for at least one vendor bid, to transmit via the communications interface vendor data for a vendor associated with the at least one vendor bid to a mobile electronic device for storage at the mobile electronic device in association with the keyword.

Figure 1:
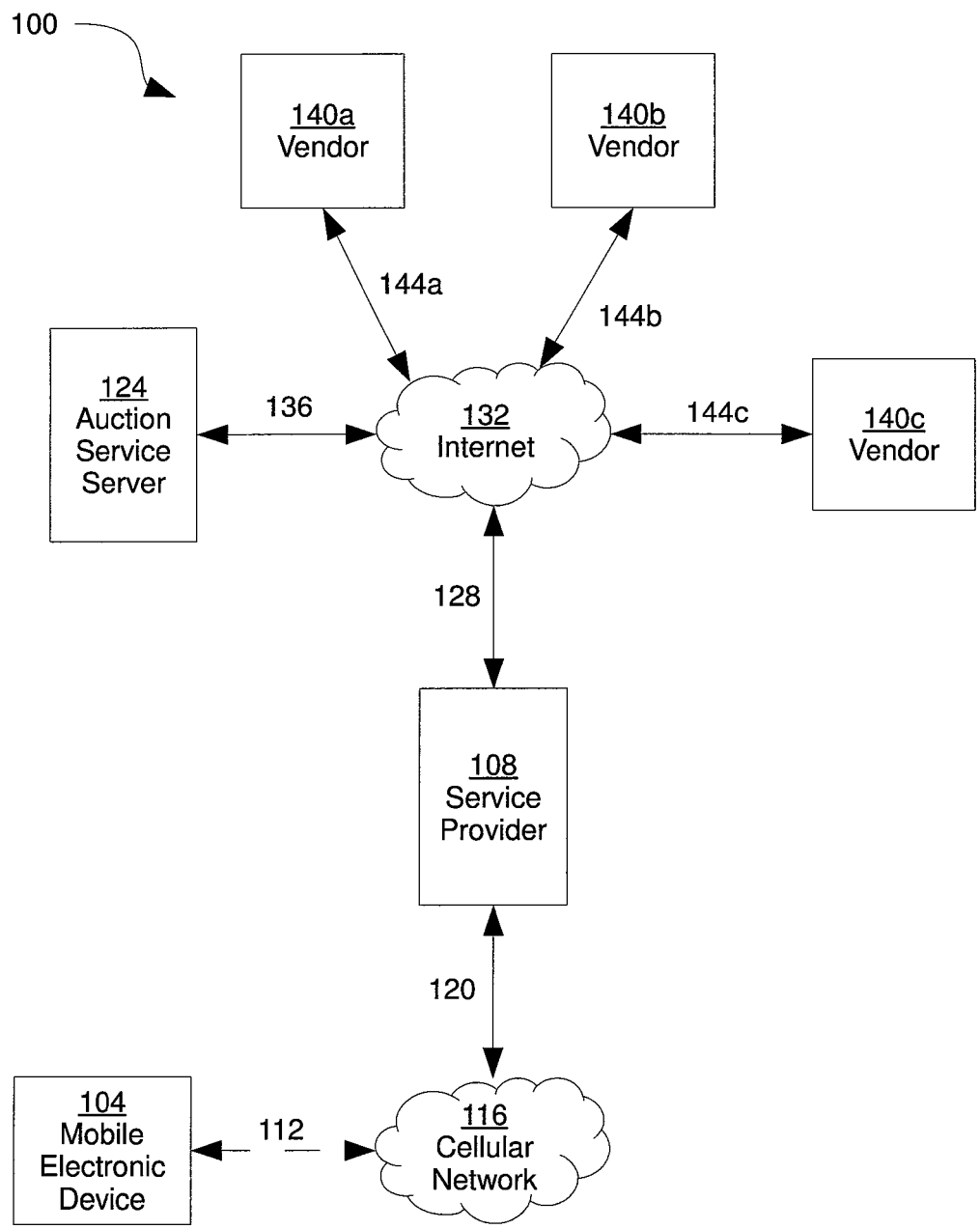
FIG. 1 depicts a communications system, according to a non-limiting embodiment.

FIG. 1 depicts a communications system 100. System 100 includes a mobile electronic device 104 which, in the presently described example embodiment, is based on the operating environment and functionality of a hand-held wireless communication device. It will be understood, however, that mobile electronic device 104 is not limited to a hand-held wireless communication device. Other mobile electronic devices are also contemplated, such as cellular telephones, smart telephones, Personal Digital Assistants ("PDAs"), media or MP3 players, laptop computers, and the like.

Mobile electronic device 104 communicates with a service provider 108 (such as a cellular carrier) to exchange voice and data via a wireless link 112, a cellular network 116, and a wired link 120. Link 112 and cellular network 116 can be based on any suitable cellular network including, for example, Global System for Mobile communications ("GSM"), General Packet Radio Service ("GPRS"), Enhanced Data rates for GSM Evolution ("EDGE"), the third-generation mobile communication system (3G), the fourth-generation mobile communication system (4G), and the like. It will be understood that link 112 can also include any base stations and backhaul links necessary to connect mobile electronic device 104 to cellular network 116.

Service provider 108, in turn, communicates with an auction service server 124 to exchange data via a link 128, the Internet 132 and a link 136. In the present example embodiment, links 128 and 136 are wired links. Auction service server 124 communicates, via link 136 and Internet 132, with a plurality of vendor servers 140a, 140b, 140c (collectively referred to as vendor servers 140, and generically, as a vendor server 140; similar nomenclature is used elsewhere herein) connected with Internet 132 via links 144a, 144b and 144c respectively. Each vendor server 140 is operated by a vendor of one or more offerings, also referred to as products or services (for example, restaurants, and the like).

Cellular network 116 and Internet 132 are provided solely for illustrative purposes. It is contemplated that in some embodiments, the various components of system 100 can communicate via any suitable combination of wired networks, wireless networks, or both, including without limitation a Wide Area Network ("WAN") such as Internet 132, a Local Area Network ("LAN"), cellular networks, WiFi networks, WiMax networks, and the like. The various links of system 100 are selected for compatibility with the networks employed in system 100. In some embodiments, for example, mobile electronic device 100 can communicate directly with auction service server 124 over a network such as Internet 132, without using service provider 108 as an intermediate entity.

In general, system 100 provides for the implementation of a method and apparatus for associating vendor data with keywords, as discussed in greater detail below.

Figure 2:
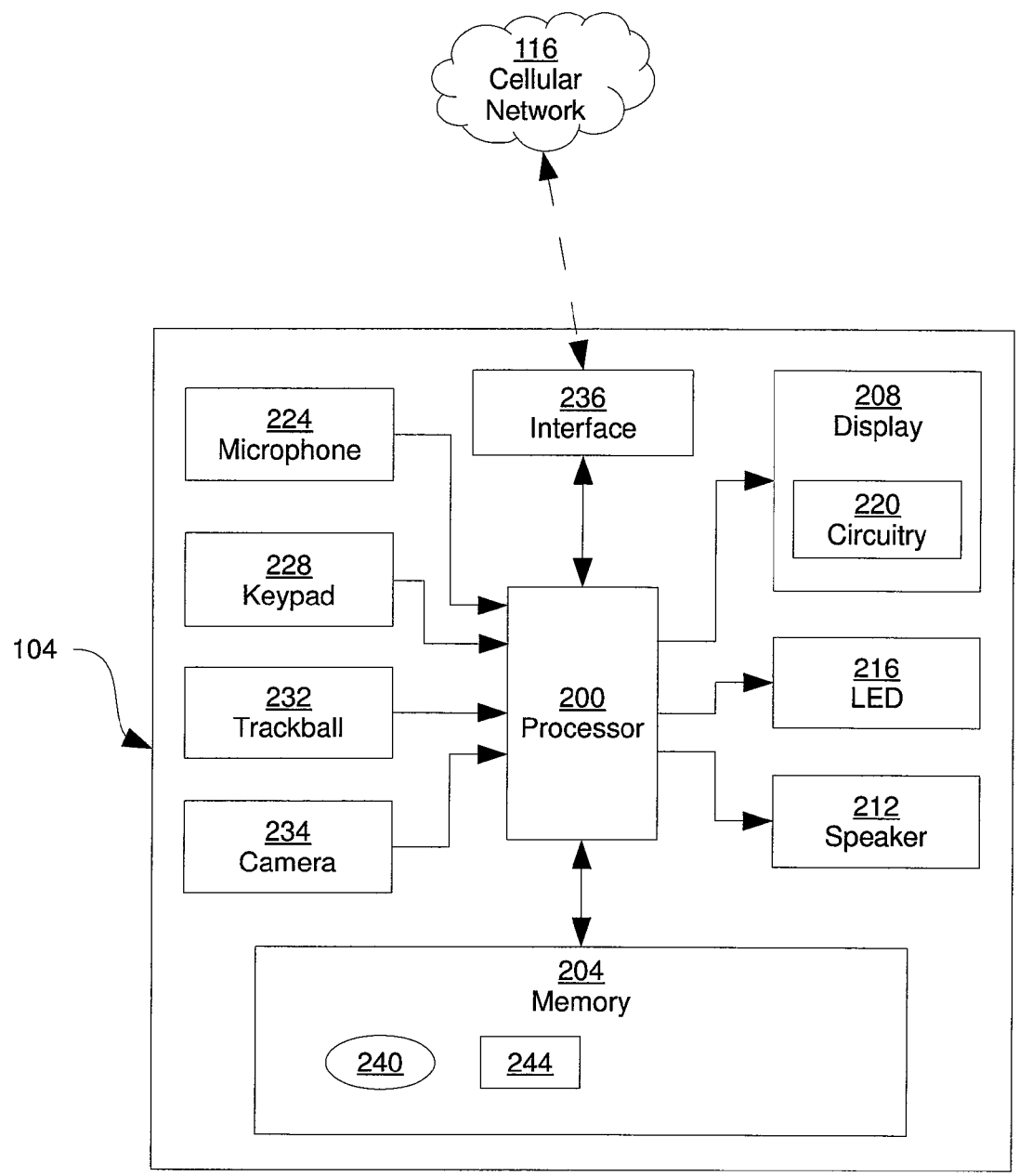
FIG. 2 depicts a schematic block diagram of certain components of the mobile electronic device of FIG. 1, according to a non-limiting embodiment.

Referring now to FIG. 2, a schematic block diagram of certain components of mobile electronic device 104 is depicted. Mobile electronic device 104 includes a processor 200 interconnected with a computer readable storage (i.e. non-transitory) medium such as a memory 204. Memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Mobile electronic device 104 further includes one or more output devices interconnected with processor 200, such as a display 208. It will be appreciated that other output devices are also contemplated. For example, mobile electronic device 104 can also include a speaker 212, a light-emitting indicator such as a Light Emitting Diode (LED) 216, and the like. Display 208 includes display circuitry 220 controllable by processor 200 for generating representations of data, applications, or both, maintained in memory 204. Display 208 includes a flat panel display (e.g. Liquid Crystal Display (LCD), plasma display, Organic Light Emitting Diode (OLED) display). Circuitry 220 can thus include any suitable combination of display buffers, transistors, LCD cells, plasma cells, phosphors, and the like.

Mobile electronic device 104 additionally includes one or more input devices interconnected with processor 200, including without limitation a microphone 224, a keypad 228 (which, in some example embodiments, includes a keyboard such as a QWERTY keyboard or reduced QWERTY keyboard, and a plurality of additional function keys), an input navigation device such as a trackball 232 and a camera 234. It will now be apparent that in some example embodiments, other combinations of input apparatuses can be provided. In some non-limiting embodiments, for example, trackball 232 can be replaced with a touchpad (not shown). In further non-limiting embodiments, one or both of keypad 228 and trackball 232 can be omitted, and a touch screen input device (not shown) can be integrated with display 208. In still other non-limiting embodiments, the touch screen input device can be provided in addition to keypad 228 and trackball 232. Further variations will occur to those skilled in the art. In general, the input devices of mobile electronic device 104 are configured to provide input data to processor 200 representative of input received at the input devices.

Mobile electronic device 104 also includes a communications interface 236 interconnected with processor 200. Communications interface 236 allows mobile electronic device 104 to communicate with cellular network 116 (and, for example, service provider 108) via link 112. It is contemplated that in some embodiments, communications interface can be configured to allow for communications with multiple networks, including Internet 132. It is further contemplated that communications interface can also allow mobile electronic device 104 to communicate over short-range wired or wireless links such as Universal Serial Bus ("USB") and Bluetooth™ links (not shown).

The various components of mobile electronic device 104 are interconnected, for example via a communication bus (not shown). Mobile electronic device 104 can be powered by a battery (not shown), though it will be understood that mobile electronic device 104 can also be supplied with electricity by a wired connection to a wall outlet or other power source, for example when docked.

Mobile electronic device 104 maintains in memory 204 one or more applications. In particular, shown in FIG. 2 is a keyword management application 240 (also referred to herein as "keyword application 240"). Keyword application 240 includes computer-readable instructions executable by processor 200. Processor 200, via execution of the instructions of keyword application 240, can be configured to carry out various functions, as discussed below.

Figure 3:
FIG. 3 depicts an example keyword list maintained by the mobile electronic device of FIG. 1, according to a non-limiting embodiment.

Also maintained in memory 204 is a keyword list 244. Turning to FIG. 3, an example keyword list 244 is shown. Although keyword list 244 is depicted in a tabular format, any suitable format can be used for storing keyword list 244. Keyword list 244 includes one or more entries, each shown as a single row of the table of FIG. 3 (it will be appreciated that the header row is provided solely for illustrative purposes and need not actually be included in keyword list 244). Each entry includes a keyword, such as "pizza". In general, each keyword is an identifier of a vendor offering (i.e. product or service), or a group of products or services. Each entry in keyword list 244 also includes a reference to a vendor contact record associated with the keyword and a reference to an action associated with the keyword and contact record. It is contemplated that the contact record is maintained separately from keyword list 244. However, in some embodiments contact records can be stored directly within keyword list 244.

In general, keyword application 240 configures processor 200 to manage keyword list 244, allowing changes to be made to keyword list 244 (such as adding new keywords and associated contacts and actions) and allowing the actions associated with keywords to be carried out. For example, processor 200 is configured, via execution of keyword application 240, to control display 208 to generate a representation of at least a portion of keyword list 244. Processor 200 can then be configured, upon receiving input data (for example, from trackball 232) indicative of a selection of the keyword "pizza" on the representation, to dial the telephone number contained in the contact record for "Alice's Pizzeria".

As a further example, processor can be configured to receive input data indicative of a selection of the keyword "Search", and in response, to execute a browser application and go to the URL specified in the contact record for "Acme Search", as specified in the second entry of keyword list 244 as shown in FIG. 3. In other words, selection of a keyword results in the performance of an action in relation to a vendor known to offer the products or services identified by that keyword.

Figure 4:
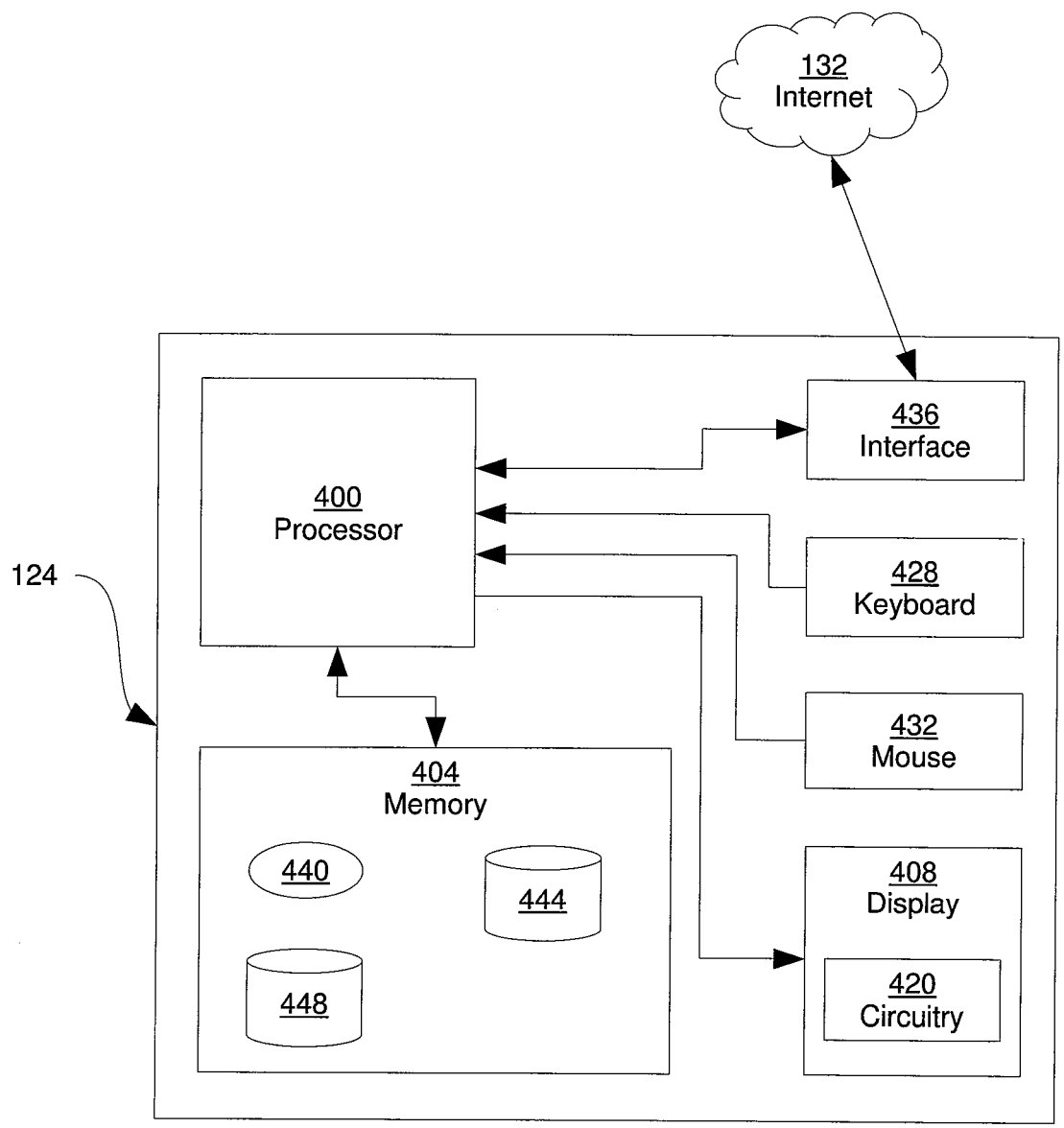
FIG. 4 depicts a schematic block diagram of certain components of the auction service server of FIG. 1, according to a non-limiting embodiment.

Referring now to FIG. 4, a schematic block diagram of certain components of auction service server 124 (also referred to herein as "auction server 124") is depicted. Auction server 124 includes a processor 400 interconnected with a computer readable storage (i.e. non-transitory) medium such as a memory 404. Memory 404 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Auction server 124 can also include input devices such as a keyboard 428 and a mouse 432, and an output device such as a display 408 comprising display circuitry 420. While the input and output devices depicted in FIG. 4 are co-located with auction server 124, it is contemplated that in some embodiments the input and output devices can be located remotely (or additional input and output devices can be located remotely) from auction server 124 for remote management of auction server 124. Auction server 124 also includes a communications interface 436 compatible with Internet 132 and any other networks to which it is desirable for auction server 124 to connect.

Auction server 124 maintains, in memory 404, a keyword auction application 440 (also referred to herein as "auction application 440"). Auction application 440 includes computer-readable instructions executable by processor 400. Processor 400, via execution of the instructions of keyword application 440, can be configured to carry out various functions, as discussed below. In general, auction server 124 allows for the population of keyword list 244 at mobile electronic device 104 with keywords and contacts. More particularly, auction server 124 receives auction requests. Each auction request includes a keyword which identifies a required offering (that is, an offering for which it is desired that vendor data be transmitted to mobile electronic device 104). The keyword is to be added to keyword list 244, along with vendor data, such as contact information, for a vendor offering the products or services identified by the keyword. The auction request also includes one or more parameters associated with the keyword. The parameters define required attributes of the required offering, and thus represent criteria that the vendor whose contact information will be added to keyword list 244 must satisfy. In other words, a spot in keyword list 244 is auctioned off among various vendors, with the winning vendor being added to keyword list 244. The parameters in the auction request set the minimum bid. Auction server 124 collects vendor bids (each having parameters defining the products or services offered by the vendors) and identifies the bid that best satisfies the parameters in the auction request. The contact information for the winning vendor is entered in keyword list 244 along with the keyword.

Figure 5:
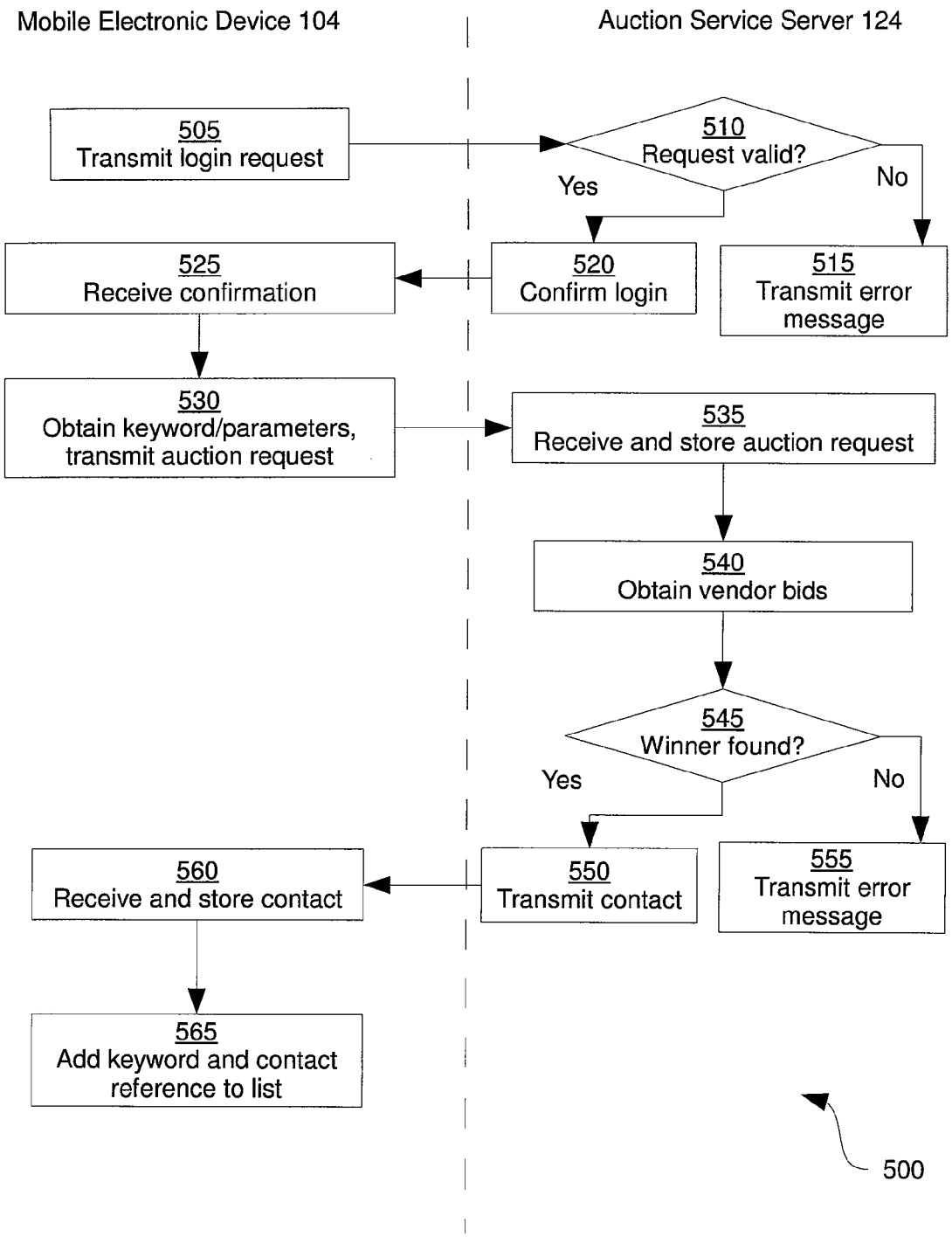
FIG. 5 depicts a schematic block diagram of a method of associating vendor data with keywords, according to a non-limiting embodiment.

Turning now to FIG. 5, a block diagram of a method 500 of associating vendor data with keywords is depicted. Beginning at block 505, processor 200 of mobile electronic device 104 is configured to transmit, via communications interface 236, a login request to auction server 124. The login request includes a username and password or other suitable credentials. For example, processor 200 can be configured, via execution of keyword application 240, to control display 208 for generating a login screen (not shown). Processor 200 can then receive input data representative of, for example, entries on keypad 228 made in connection with username and password fields in the login screen, and transmit the received input data as part of the login request.

At block 510, processor 400 of auction server 124 is configured, via execution of auction application 440, to receive the login request and determine whether the login request is valid. The determination can be performed, for example, by comparing the credentials received with the request with credentials stored in a profile database. Referring briefly to FIG. 4, a profile database 444 is shown as being maintained in memory 404. Profile database 444 can include login credentials for each of a plurality of accounts, and the credentials received at block 510 can thus be compared to those in profile database 444 to determine if mobile electronic device 104 should be permitted to continue accessing auction server 124.

When the determination at block 510 is negative, method 500 proceeds to block 515, at which an error message is transmitted to mobile electronic device 104 indicating that authentication was unsuccessful. The performance of method 500 then ends.

On the other hand, when the determination at block 510 is affirmative, method 500 proceeds to block 520 where processor 400 transmits, via communications interface 436, a confirmation message to mobile electronic device 104. The confirmation message confirms that mobile electronic device 104 has been successfully authenticated with auction server 124.

At block 525, processor 200 receives the confirmation message via communications interface 236. Proceeding to block 530, mobile electronic device 104 obtains a keyword and one or more associated parameters and transmits an auction request message to auction server 124. The auction request message contains the keyword associated parameters. In the present example performance of method 500, processor 200 is configured to receive input data from one or more input devices of mobile electronic device 104 representing a keyword and parameters. For example, processor 200 can be configured to obtain the keyword and parameters by controlling display 208 to generate a representation of keyword application 240 including prompts for input data representing the keyword and parameters.

Figure 6:
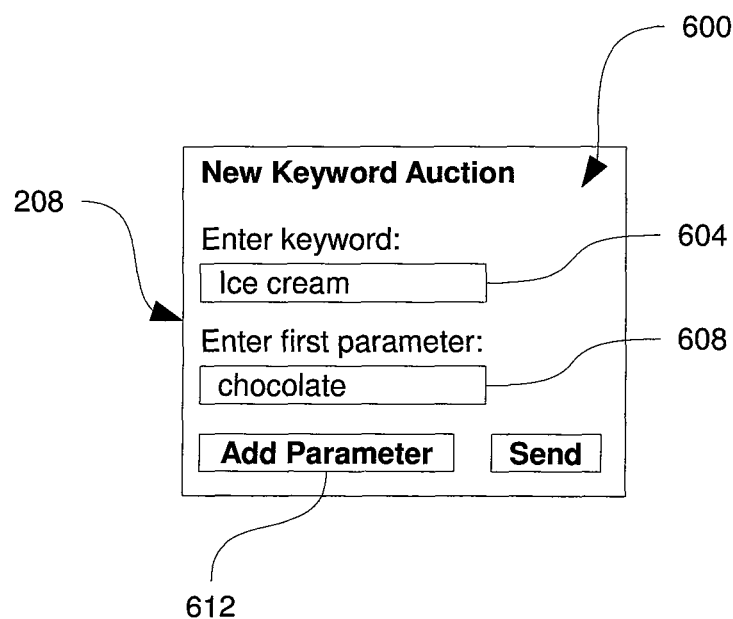
FIG. 6 depicts an example representation generated by a display of the mobile electronic device of FIG. 1, according to a non-limiting embodiment.

Referring to FIG. 6, a representation 600 of keyword application 240 is shown generated by display 208. Representation 600 includes selectable data-entry fields 604 and 608. Receipt of input data (for example, from trackball 232) indicating selection of field 604 configures processor 200 for receiving further input data (for example, representative of entries on keypad 228) defining a keyword. Similarly, receipt of input data indicating selection of field 608 configures processor 200 for receiving further input data defining a parameter associated with the keyword. In FIG. 6, the keyword "ice cream" is shown as having been entered into field 604, while the parameter "chocolate" is shown as having been entered into field 608. In other words, processor 200 has received input data defining the keyword "ice cream" and an associated parameter, "chocolate". It is contemplated that processor 200 can control display 208 to generate a representation with additional parameter fields following receipt of input data indicating selection of the "add parameter" button 612.

For the present example performance of method 500, it will be assumed that in addition to the keyword "ice cream" and the parameter "chocolate" (indicating that the winning vendor must sell chocolate-flavoured ice cream) another parameter is received at processor, indicating a desired price of two dollars ($2.00). This can be an indication of the maximum price that the winning vendor can charge for chocolate ice cream. Having received the keyword and parameters, processor 200 is configured to transmit an auction request containing the keyword and parameters to auction server, via service provider 108.

At block 535, processor 400 of auction server 124 receives, via communications interface 436, the auction request from mobile electronic device 104. Proceeding to block 540, processor 400 is configured, via execution of auction application 440, to retrieve vendor bids for the keyword and parameters in the auction request. In the present example performance of method 500, processor 400 is configured to maintain vendor information in memory 404. Vendor information can be obtained for storage in memory 404 via any suitable means, including a request transmitted to vendor servers 140, input data received from keyboard 428 and mouse 432, and the like.

Figure 7:
FIG. 7 depicts an example vendor database maintained by the auction service server of FIG. 1, according to a non-limiting embodiment.

Referring briefly to FIG. 4, vendor information is maintained in memory 404 in a vendor database 448. It is contemplated that any suitable database structure can be used to store vendor information. In general, vendor database 448 contains, for each one of vendor servers 140, a list of keywords corresponding to products or services offered by the operator of the vendor server 140 and a list of parameters for each one of those keywords. Referring to FIG. 7, a portion of an example vendor database 448 is shown. It will be assumed that the portion of vendor database 448 shown in FIG. 7 relates only to the vendor keyword "ice cream" for simplicity (that is, other vendors associated with other keywords are not shown). It is contemplated that vendor database 448 can be indexed by any combination of keyword, vendor name, parameter, and the like. Vendor database 448 includes two vendor parameter entries for each of vendor servers 140. In particular, the parameter entries are identified as "flavours" and "price".

Processor 400 can therefore be configured to obtain vendor bids by executing a database query to vendor database 448. It is contemplated that in other embodiments, vendor information is not maintained by auction server 124. In such embodiments, vendor bids can be obtained by way of bid requests from auction server 124 to each vendor server.

Each vendor bid includes the vendor parameters associated with the vendor keyword matching the auction request keyword. Thus, in the present example performance of method 500, the retrieved bid for vendor server 140a includes the parameters "vanilla," "mint," and "$3.50". The vendor bid for vendor server 140b includes the parameters "chocolate" and "$1.90" and the vendor bid for vendor server 140c includes the parameters "chocolate," "vanilla," and "$1.85".

When processor 400 has obtained the vendor bids for the keyword in the auction request, method 500 proceeds to block 545. At block 545, processor 400 is configured to compare the vendor bids obtained at block 540 and determine whether each of the vendor bids satisfies the requirements set out by the auction request parameters and select a winning bid. The performance of block 545 can include a comparison of the vendor parameters with the parameters in the auction request. Thus, continuing with the bids derived from vendor database 448 as shown in FIG. 7, the bid corresponding to vendor server 140a cannot be a winning bid, as the parameter "chocolate" is not contained in that bid, and the price in that bid exceeds the maximum price of $2.00 set in the auction request.

The bids corresponding to vendor servers 140b and 140c both satisfy the parameter "chocolate" and the parameter defining a maximum price of $2.00. The bid corresponding to vendor 140c, however, includes an additional flavour (vanilla) and has a lower price. Thus, processor 400 determines at block 545 that the vendor bid corresponding to vendor server 140c is the winning bid. Method 500 then proceeds to block 550. It will now be apparent that the selection of a winning bid from among multiple "satisfactory" vendor bids can include any suitable combination of selection of the vendor bid with the greatest number of additional vendor parameters, selection of the vendor bid which surpasses the required attributes by the greatest margin, and the like.

It is contemplated that when the determination at block 545 is negative (that is, when none of the vendor bids satisfy the parameters specified in the auction request), method 500 proceeds to block 555, at which an error message is transmitted from auction server 124 to mobile electronic device 104. Method 500 then ends.

Returning to the present example performance of method 500, at block 555, processor 400 is configured to transmit a contact record for the vendor operating vendor server 140c to mobile electronic device 104. Processor 400 can maintain vendor contact records in vendor database 448, or, in other embodiments, can transmit a request to vendor server 140c for a contact record during the performance of block 550.

Figure 8:
FIG. 8 depicts the keyword list of FIG. 3 following the performance of the method of FIG. 5, according to a non-limiting embodiment.

At block 560, processor 200 of mobile electronic device 104 receives, via communications interface 236, the contact record for the vendor operating vendor server 140c. Processor 200 stores the received contact record in memory 204, and proceeds to block 565, at which the keyword, a reference to the contact record, and an action are added to keyword list 244. Referring to FIG. 8, keyword list 244 following the above example performance of method 500 is shown. As seen in FIG. 8, an additional entry has been added to keyword list 244, including the keyword "ice cream" and a reference to the contact "Bob's Ice Cream" (assumed to be the vendor which operates vendor server 140c). Keyword list 244 also includes an action associated with the keyword "ice cream" and corresponding vendor. In particular, the action is "Go to Map". Thus, when the keyword "ice cream" is selected, processor 200 will be configured to execute a map application (not shown) maintained in memory 204 and control display 208 to generate a representation of the location of "Bob's Ice Cream" on a map (based, for example, on the address of Bob's Ice Cream maintained in the contact record received from auction server 124).

It is contemplated that a wide variety of keywords and parameters can be used. Parameters can include, for example, location or maximum acceptable distance from the current location of mobile electronic device 104, maximum acceptable price, reputation or customer satisfaction, and the like. Parameters such as reputation can be obtained by auction server 124 from vendor servers themselves, or from one or more third-party servers (not shown) which collect reputation statistics (such as customer reviews) relating to vendors. In such embodiments, processor 400 can be configured to obtain vendor bids at block 540 by transmitting one or more requests to such third-party servers as well as the database queries mentioned above.

It is also contemplated that in some embodiments, the parameters transmitted in the auction request can include processing instructions for auction server 124. For example, an auction request for the keyword "hotel" can include a price parameter (for example, one hundred dollars per night) with a processing instruction specifying that the winning bid must have a price that is higher than the price parameter (as opposed to lower, as with the ice cream example above).

Processing instructions can also include, in some example embodiments, category identifiers for parameters. For example, an auction request can include the keyword "pizza" and the parameter "20:00". The auction request can also include a processing instruction associated with the parameter "20:00" indicating that the category of that parameter is "delivery time" (meaning a desired delivery time of twenty minutes). Thus, auction requests can instruct auction server 124 how to process certain parameters when it may otherwise be unclear: a different auction request could include the same keyword and parameter but the category identifier "closing time" (meaning a desired closing time no earlier than 8:00 pm).

Figure 9:
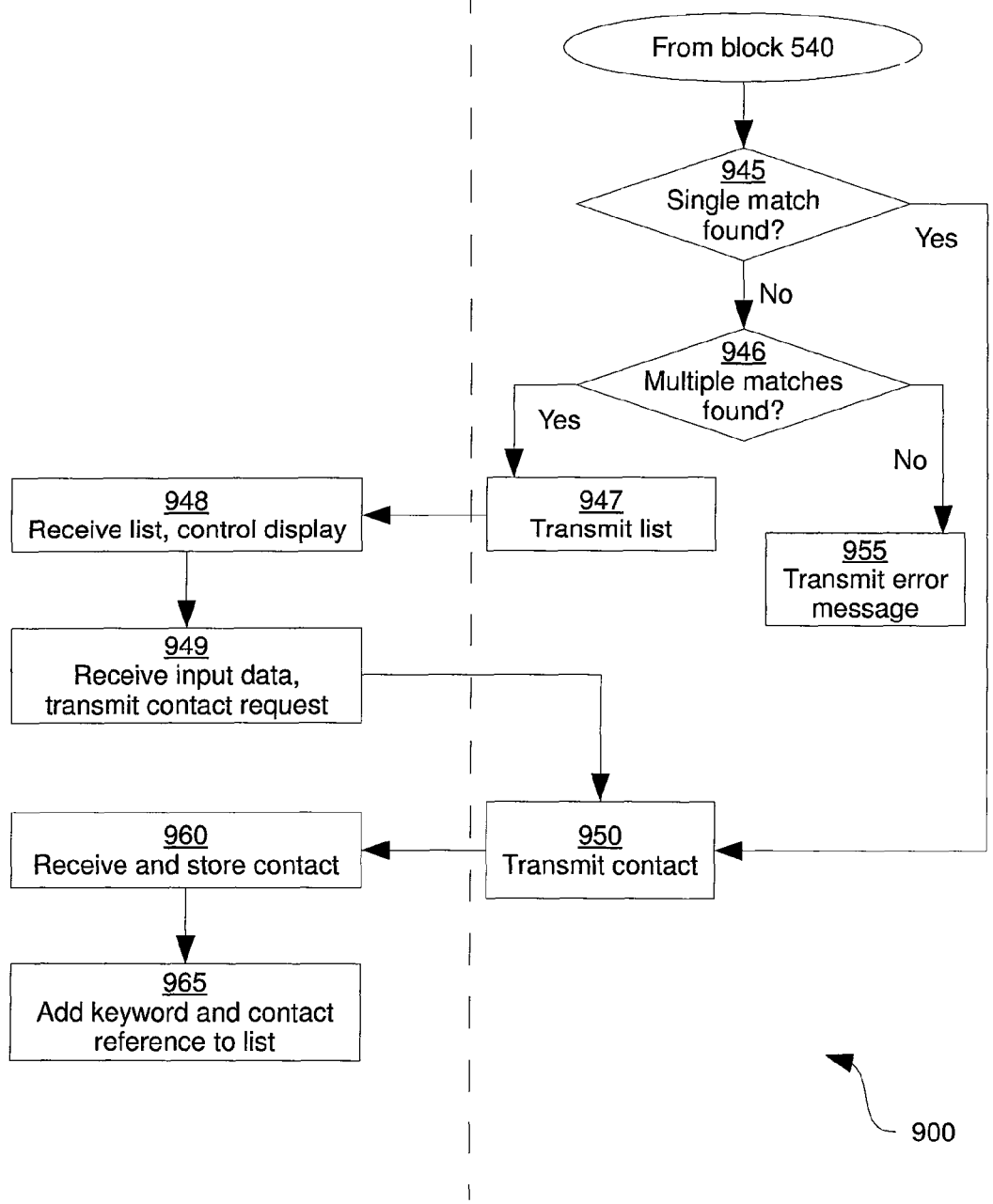
FIG. 9 depicts a schematic block diagram of a method of associating vendor data with keywords, according to a further non-limiting embodiment.

Referring now to FIG. 9, a block diagram of a method 900 of associating vendor data with keywords is depicted, according to a further embodiment. Performance of method 900 proceeds according to method 500 as described above, up to and including the performance of block 540. At block 945, processor 400 is configured to determine whether or not a single vendor bid satisfies the parameters from the auction request. Taking up the "ice cream" example discussed during the performance of method 500, both vendor servers 140b and 140c satisfied the parameters "chocolate" and "$2.00". Therefore, the determination at block 945 is negative, and method 900 proceeds to block 946.

At block 946, having determined that a single match has not been found (that is, a single satisfactory vendor bid), processor 400 is configured to determine whether multiple vendor bids satisfy the parameters of the auction request. If the determination at block 946 is negative, no satisfactory vendor bids were obtained at block 540 and method 900 proceeds to block 955, where an error message is transmitted to mobile electronic device 104. However, continuing with the present example performance of method 900, the bids associated with vendor servers 140b and 140c both contain parameters which satisfy the parameters of the auction request. The determination at block 946 is therefore affirmative, and method 900 proceeds to block 947.

At block 947, rather than selecting a winner from among the satisfactory vendor bids, processor 400 is configured to transmit a list of the satisfactory vendor bids to mobile electronic device 104. At block 948, processor 200 is configured, upon receipt of the list from auction server 124, to control display 208 to generate a representation of the list, in which each satisfactory vendor bid is presented as a selectable element in the representation.

Proceeding to block 949, processor 200 is configured to receive input data indicating a selection of one of the satisfactory vendor bids presented on display 208 and, in response, to transmit a contact request to auction server 124 for the contact record of the vendor corresponding to the selected vendor bid.

At block 950, auction server 124 receives the contact request and transmits the requested contact record to mobile electronic device 104, as described above in connection with block 550. It is also noted that an affirmative determination at block 945 leads directly to the performance of block 950. The performance of blocks 960 and 965 at mobile electronic device 104 are as described above in connection with blocks 560 and 565 of method 500, respectively.

It is contemplated that the performance of methods 500 and 900 can be initiated in response to input data received at processor 200 representing, for example, selection of a "log in" option provided on display 208. In other embodiments, it is contemplated that performance of methods 500 and 900 can be automatically initiated by processor 200, for example upon startup of mobile electronic device 104 or upon a detection by processor 200 that a particular type of link is available coupling mobile electronic device 104 to service provider 108.

Further variations are also contemplated. In some embodiments, keyword list 244 can contain different combinations of contacts and actions for different locations. The active contacts and actions can be marked in keyword list 244, for example by a flag. In some embodiments, processor 200 can be configured to determine the location of mobile electronic device 104, and to determine the distance between mobile electronic device 104's location and the location of a contact in keyword list 244 (such as "Alice's Pizzeria"). When the distance is greater than a predetermined threshold maintained within memory 204, processor 200 can be configured to automatically begin performance of method 500 or method 900. The predetermined threshold can be set within the contact record for "Alice's Pizzeria". For example, the threshold can correspond to the delivery area of the vendor. The contact associated with the keyword "pizza" can be maintained in keyword list 244 in connection with a second location rather than replacing "Alice's Pizzeria".

Processor 200 can also be configured to determine when the distance between mobile electronic device 104 and the vendor has fallen below the threshold, and in response, to mark the first contact ("Alice's Pizzeria") as the active contact.

Although methods 500 and 900 are described herein as being initiated by mobile electronic device 104, performance of the methods can also be initiated by other entities. In some embodiments, for example, service provider 108 can transmit one or more auction requests to auction server 124 and store the contacts received from auction server 124 in a memory. Service provider 108 can then load newly registered mobile electronic devices (for example, at a point of sale) with the received contacts. In other embodiments, a manufacturer (not shown) of mobile electronic device 104 can transmit auction requests to auction server 124 and load newly manufactured mobile electronic devices with the contacts received from auction server 124.

Those skilled in the art will appreciate that in some embodiments, the functionality of processors 200 and 400 executing, respectively, keyword application 240 and auction application 440, can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of associating vendor data with product identifiers at a mobile electronic device, the method comprising:
   using a processor device operably coupled with a memory, performing instructions stored in the memory, the instructions comprising:
   populating a list of product identifiers by performing:
   transmitting a request to a server, the request comprising:
   a product identifier identifying at least one product or service offered by a vendor; and one or more attributes of the at least one product or service for which to obtain vendor bids at the server; when at least one vendor bid satisfies the request;
receiving, from the server, vendor data comprising contact data for multiple vendor locations for at least one vendor associated with the product identifier;
storing the product identifier as an entry in the list of product identifiers stored within the mobile electronic device;
for each of the multiple vendor locations, storing a different vendor-action combination of contact data and action in association with the product identifier, each vendor-action combination comprising:
the contact data stored at the mobile electronic device; and instructions for the action, wherein the action is based on the contact data and the instructions specify a command to execute on the contact data when the product identifier is selected;
determining a current geographic location of the mobile electronic device; and based on the current geographic location of the mobile electronic device, flagging a stored vendor-action combination associated with the product identifier as active/inactive based upon a threshold distance to the vendor;
responsive to a subsequent selection of the product identifier at the mobile electronic device, accessing the entry associated with the selected product identifier and selecting the vendor-action combination flagged as active; and
executing the command specified by the action in the active vendor-action combination associated with the product identifier.

2. The method of claim 1, further comprising:
using a communications interface operably coupled with the processor device, receiving input from a user, the input specifying the product identifier identifying the at least one product or service for which to obtain the vendor bids at the server, each vendor bid comprising a vendor identifier and one or more vendor parameters associated with the vendor identifier, each vendor identifier identifying at least one product or service being offered by a vendor and each vendor parameter of the respective vendor identifier defining an attribute of the at least one product or service being offered by the vendor.

3. The method of claim 2, wherein receiving the input further comprises receiving the one or more attributes of the at least one product or service.

4. The method of claim 1, wherein the request is specified by a user at the mobile electronic device.

5. The method of claim 1, further comprising:
receiving a list of multiple vendor bids when more than one vendor bid satisfies the request; and
selecting one of the multiple vendor bids.

6. The method of claim 1,
wherein the contact data comprises a telephone number of the vendor associated with the product identifier; and
wherein executing the command comprises dialing the telephone number.

7. The method of claim 1,
wherein the contact data comprises a location of the vendor associated with the product identifier; and
wherein executing the command comprises executing a map application generating a map showing the location of the vendor.

8. A mobile electronic device comprising: a memory;
a communications interface; and
a processor device operably coupled with the memory and the communications interface, and executing instructions stored in the memory, the instructions comprising:
populating a list of product identifiers by performing:
transmitting a request to a server, the request comprising:
a product identifier identifying at least one product or service offered by a vendor; and
one or more attributes of the at least one product or service for which to obtain vendor bids at the server; and when at least one vendor bid satisfies the request:
receiving, from the server, vendor data comprising contact data for multiple vendor locations for at least one vendor associated with the product identifier;
storing the product identifier as an entry in the list of product identifiers stored within the mobile electronic device;
for each of the multiple vendor locations, storing a different vendor-action combination of contact data and action in association with the product identifier, each vendor-action combination comprising: the contact data; and
instructions for the action in association with the product identifier, wherein the action is based on the contact data and the instructions specify a command to execute on the contact data when the product identifier is selected;
determining a current geographic location of the mobile electronic device; based on the current geographic location of the mobile electronic device, flagging a stored vendor-action combination associated with the product identifier as active/inactive based upon a threshold distance to the vendor;
responsive to a subsequent selection of the product identifier at the mobile device, accessing the entry associated with the selected product identifier and selecting the vendor-action combination flagged as active; and
executing the command specified by the action in the active vendor-action combination associated with the product identifier.

9. The mobile electronic device of claim 8, further comprising:
using the communications interface, receiving input from a user, the input specifying the product identifier identifying the at least one product or service for which to obtain the vendor bids at the server, each vendor bid comprising a vendor identifier and one or more vendor parameters associated with the vendor identifier, each vendor identifier identifying at least one product or service being offered by a vendor and each vendor parameter of the respective vendor identifier defining an attribute of the at least one product or service being offered by the vendor.

10. The mobile electronic device of claim 9, wherein receiving the input further comprises receiving the one or more attributes of the at least one product or service.

11. The mobile electronic device of claim 8, wherein the request is specified by a user at the mobile electronic device.

12. The mobile electronic device of claim 8, further comprising:
using the communications interface, receiving a list of multiple vendor bids when more than one vendor bid satisfies the request; and
selecting one of the multiple vendor bids.

13. The mobile electronic device of claim 8,
wherein storing the vendor data comprises storing a telephone number of the vendor associated with the product identifier; and wherein executing the command comprises dialing the telephone number.

14. The mobile electronic device of claim 8,
wherein storing the vendor data comprises storing a location of the vendor associated with the product identifier; and
wherein executing the command comprises executing a map application generating a map showing the location of the vendor on a display of the mobile electronic device.

15. A non-transitory computer-readable storage medium for storing computer-readable instructions executable by a processor device for implementing a method of associating vendor data with product identifiers at a mobile electronic device, the method comprising:
populating a list of product identifiers by performing:
transmitting a request to a server, the request comprising:
a product identifier identifying at least one product or service offered by a vendor; and
one or more attributes of the at least one product or service for which to obtain vendor bids at the server; and
when at least one vendor bid satisfies the request:
receiving, from the server, vendor data comprising contact data for multiple vendor locations for at least one vendor associated with the product identifier;
storing the product identifier as an entry in the list of product identifiers stored within the mobile electronic device;
for each of the multiple vendor locations, storing a different vendor-action combination of contact data and action in association with the product identifier, each vendor-action combination comprising:
the contact data stored at the mobile electronic device; and instructions for the action in association with the product identifier, wherein the action is based on the contact data and the instructions specify a command to execute on the contact data when the product identifier is selected;
determining a current geographic location of the mobile electronic device; based on the current geographic location of the mobile electronic device, flagging a stored vendor-action combination associated with the product identifier as active/inactive based upon a threshold distance to the vendor;
responsive to a subsequent selection of the product identifier at the mobile electronic device, accessing the entry associated with the selected product identifier and selecting the vendor-action combination flagged as active; and
executing the command specified by the action in the active vendor-action combination associated with the product identifier.

16. The non-transitory computer readable storage medium of claim 15 further comprising:
using a communications interface, receiving input from a user comprising: the product identifier identifying the at least one product or service for which to obtain the vendor bids at the server, each vendor bid comprising a vendor identifier and one or more vendor parameters associated with the vendor identifier, each vendor identifier identifying at least one product or service being offered by a vendor and each vendor parameter of the respective vendor identifier defining an attribute of the at least one product or service being offered by the vendor; and
one or more attributes of the at least one product or service.

17. The non-transitory computer readable storage medium of claim 15, further comprising:
receiving multiple vendor bids when more than one vendor bid satisfies the request; and
selecting one of the multiple vendor bids.

\* \* \* \* \*